(12) United States Patent
Chang

(10) Patent No.: US 7,546,615 B2
(45) Date of Patent: Jun. 9, 2009

(54) DISC DRIVE

(75) Inventor: Chin-Chia Chang, Guangdong (CN)

(73) Assignee: Hon Hai Precision Industry Co., Ltd., Tu-Cheng City, Taipei Hsien (TW)

( * ) Notice: Subject to any disclaimer, the term of this patent is extended or adjusted under 35 U.S.C. 154(b) by 343 days.

(21) Appl. No.: 11/309,392

(22) Filed: Aug. 3, 2006

(65) Prior Publication Data

US 2007/0124748 A1 May 31, 2007

(30) Foreign Application Priority Data

Nov. 25, 2005 (TW) .............................. 94141530 A

(51) Int. Cl.
*G11B 17/028* (2006.01)
(52) U.S. Cl. .................................................... 720/698
(58) Field of Classification Search ................ 720/698, 720/692, 685, 715
See application file for complete search history.

(56) References Cited

U.S. PATENT DOCUMENTS

| 4,807,219 | A | | 2/1989 | Kyohya |
| 5,251,195 | A | | 10/1993 | Kawakami et al. |
| 5,610,889 | A | * | 3/1997 | Ishii et al. ................. 720/605 |
| 6,246,654 | B1 | * | 6/2001 | Omori et al. ............... 720/604 |
| 6,480,453 | B2 | * | 11/2002 | Ahn ........................... 720/639 |
| 6,584,063 | B1 | * | 6/2003 | Nagasaka et al. ........... 720/607 |
| 6,807,672 | B2 | * | 10/2004 | Kim ........................... 720/700 |
| 6,847,603 | B2 | | 1/2005 | Andersson et al. |

\* cited by examiner

*Primary Examiner*—Allen T Cao
(74) *Attorney, Agent, or Firm*—Winston Hsu

(57) ABSTRACT

A disc drive includes a base, a traverse plate secured to the base, a loading frame mounted to the base, and a spindle motor mounted to the loading frame. The traverse plate supports a pick-up unit thereon. The loading frame is separated from the traverse plate, and moveable relative to the base and the traverse plate. The spindle motor is used for rotatably supporting a disc thereon.

20 Claims, 6 Drawing Sheets

DISC DRIVE

FIELD OF THE INVENTION

This invention relates to information recording and/or reproducing apparatuses and, more particularly, to a disc drive with a structure for isolating vibrations caused by a spindle motor from a pick-up unit.

DESCRIPTION OF RELATED ART

Data discs, such as compact discs (CDs), digital video discs (DVDs), and laser discs (LDs), have become increasingly popular as information storage media due to their vast storage capacities and relatively compact structures. Related disc drives are used to record information on and/or reproduce information from the data discs.

A general disc drive includes a traverse plate, a pick-up unit, a feeding motor, and a spindle motor. The pick-up unit is moveably mounted on the traverse plate for reproducing the information recorded on the disc and/or recording information onto the disc. The feeding motor and the spindle motor are mounted on the traverse plate for driving the pick-up unit to move relative to the spindle motor and for rotatably supporting a disc thereon, respectively. When reproducing/recording, the spindle motor is driven to rise up together with the traverse plate to rotatably support the disc thereon. During reproducing/recording, the spindle motor rotates at a relatively high speed causing vibrations. The vibrations caused by the spindle motor may be transmitted to the pick-up unit and adversely affect accuracy of reproducing/recording.

Therefore, a disc drive which is capable of reducing the vibrations transmitted to the pick-up unit is desired.

SUMMARY OF THE INVENTION

In one embodiment thereof, a disc drive includes a base, a traverse plate secured to the base, a loading frame mounted to the base, and a spindle motor mounted to the loading frame. The traverse plate supports a pick-up unit thereon. The loading frame is separated from the traverse plate, and moveable relative to the base and the traverse plate. The spindle motor is used for rotatably supporting a disc thereon.

Other advantages and novel features will become more apparent from the following detailed description of preferred embodiments when taken in conjunction with the accompanying drawings, in which:

BRIEF DESCRIPTION OF THE DRAWINGS

Many aspects of the disc drive can be better understood with reference to the following drawings. The components in the drawings are not necessarily to scale, the emphasis instead being placed upon clearly illustrating the principles of the present disc drive. Moreover, in the drawings, like reference numerals designate corresponding parts throughout the several views.

DETAILED DESCRIPTION OF THE INVENTION

Reference will now be made to the drawings to describe the preferred embodiment of the present disc drive, in detail.

Figure 1:
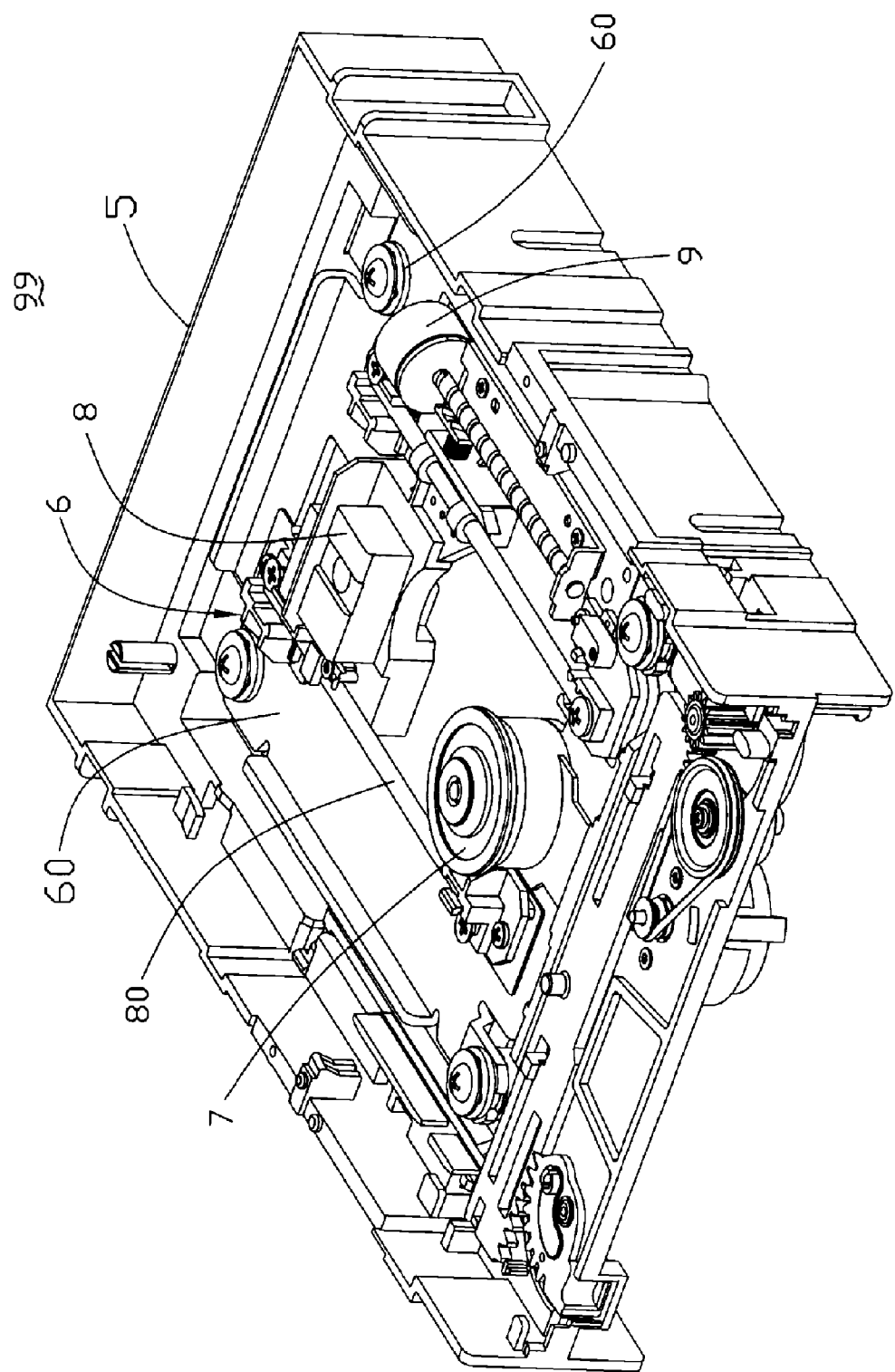
FIG. 1 is an isometric view of a general disc drive.

Referring to FIG. 1, a general disc drive 99 includes a base 5 and a traverse module 6 mounted to the base 5. The traverse module 6 includes a traverse plate 60, a spindle motor 7, a pick-up unit 8, and a feeding motor 9. The spindle motor 7 is mounted at a side of the traverse plate 60 for driving a disc (not shown) to rotate. The pick-up unit 8 is bridged over the traverse plate 60 via two parallel guiding poles 80, and is used for reproducing information recorded on and/or recording information onto the disc. The feeding motor 9 is connected to the pick-up unit 8 via a feeding screw (not labeled) and is used for driving the pick-up unit 8 to reciprocate along the guiding poles 80.

When reproducing, the traverse plate 60 is lifted up together with the spindle motor 7, so that the spindle motor 7 supports the disc accommodated on a disc tray (not shown) and drives the disc to rotate. Meanwhile, the pick-up unit 8 is driven by the feeding motor 9 to move along a radial direction of the disc, so as to reproduce the information recorded on the disc and/or record the information onto the disc. When the disc tray is driven to partially move to an outside of the disc drive, the traverse plate 60 is driven to be lowered down.

However, the spindle motor 7 rotates at a relatively high speed, and may cause unwanted vibrations. Because the spindle motor 7 and the pick-up unit 8 are secured to the traverse plate 60, the vibrations generated by the spindle motor 7 may be transmitted to the pick-up unit 8. Vibrations of the pick-up unit 8 may greatly degrade reproducing/recording accuracies of the pick-up unit 8. Moreover, if a vibration frequency of the spindle motor 7 is equal to that of the feeding motor 9, resonance occurs and intensifies the vibrations of the pick-up unit 8. Furthermore, during lifting up and lowering down of the traverse plate 60, unwanted vibrations of the traverse plate 60 may occur and play adverse effect on reproducing/recording accuracies of the pick-up unit 8.

Figure 2:
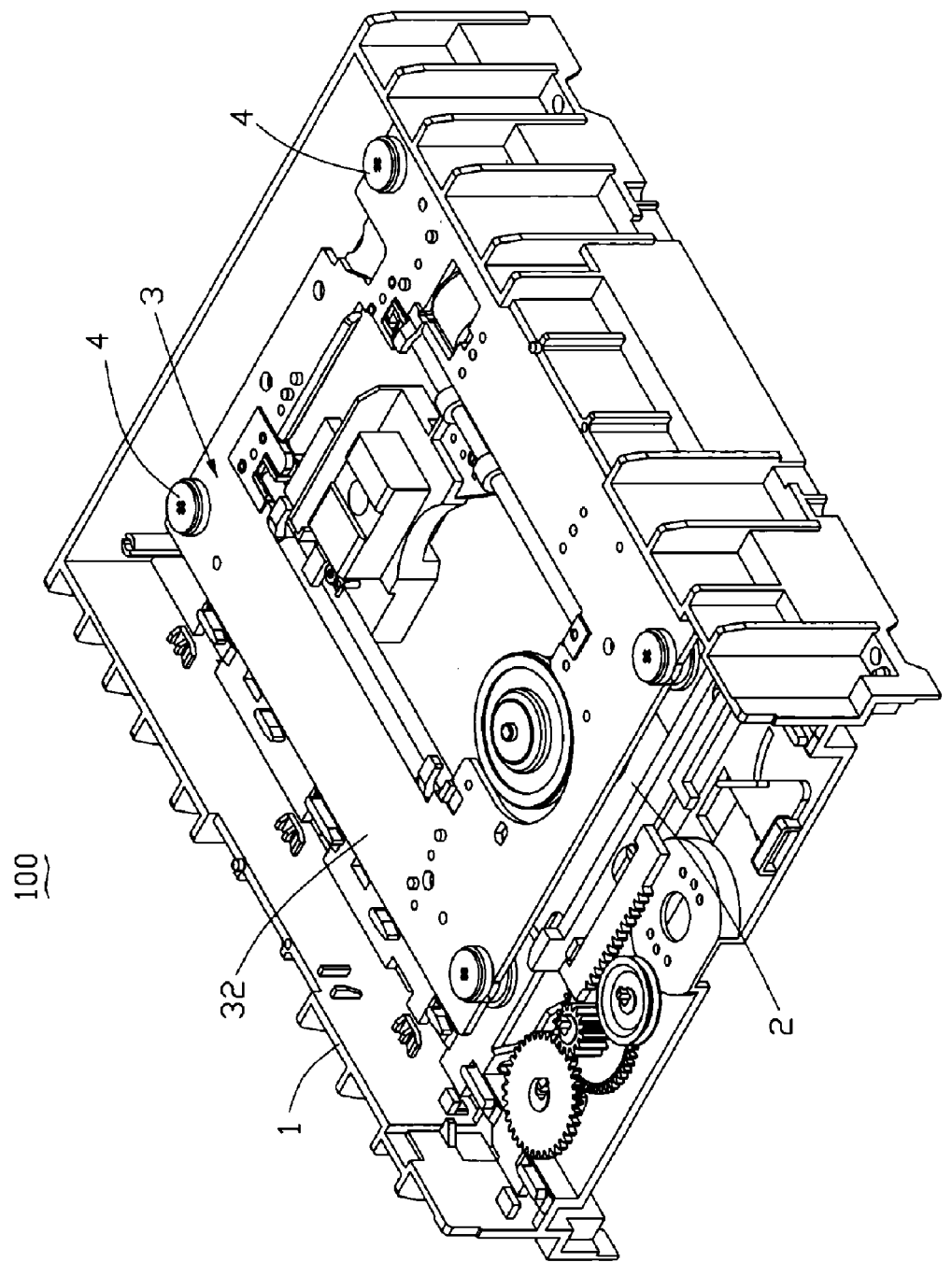
FIG. 2 is an isometric view of a disc drive in accordance with an exemplary embodiment, the disc drive including a base, a traverse module, and a loading frame.
Figure 3:
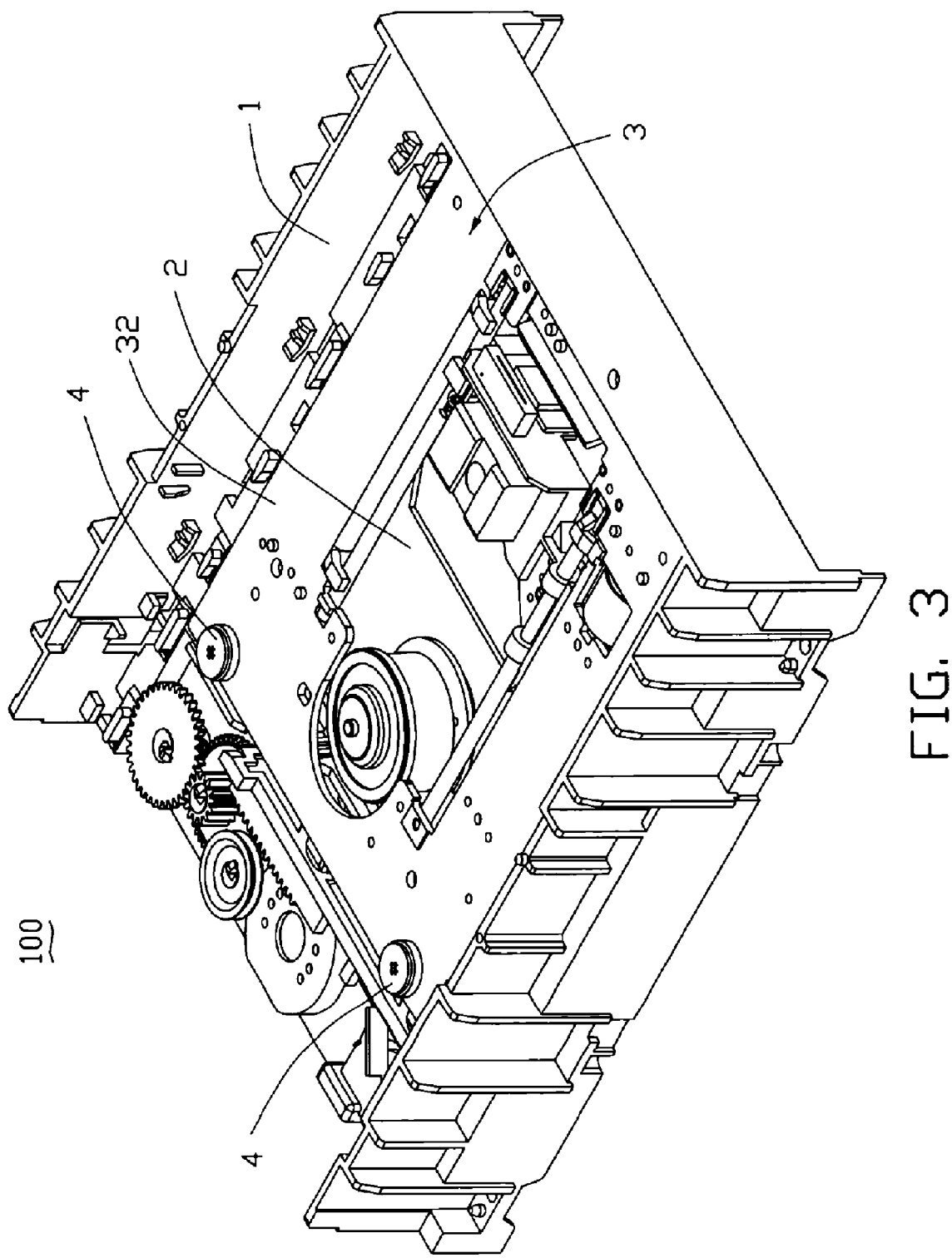
FIG. 3 is similar to FIG. 2, but viewed from another aspect.

Referring to FIG. 2 and FIG. 3, a disc drive 100 includes a base 1 and a traverse module 3 mounted to the base 1 via four fastening members 4. A loading frame 2 is secured to the base 1 and can be lifted up and lowered down relative to the base 1.

Figure 4:
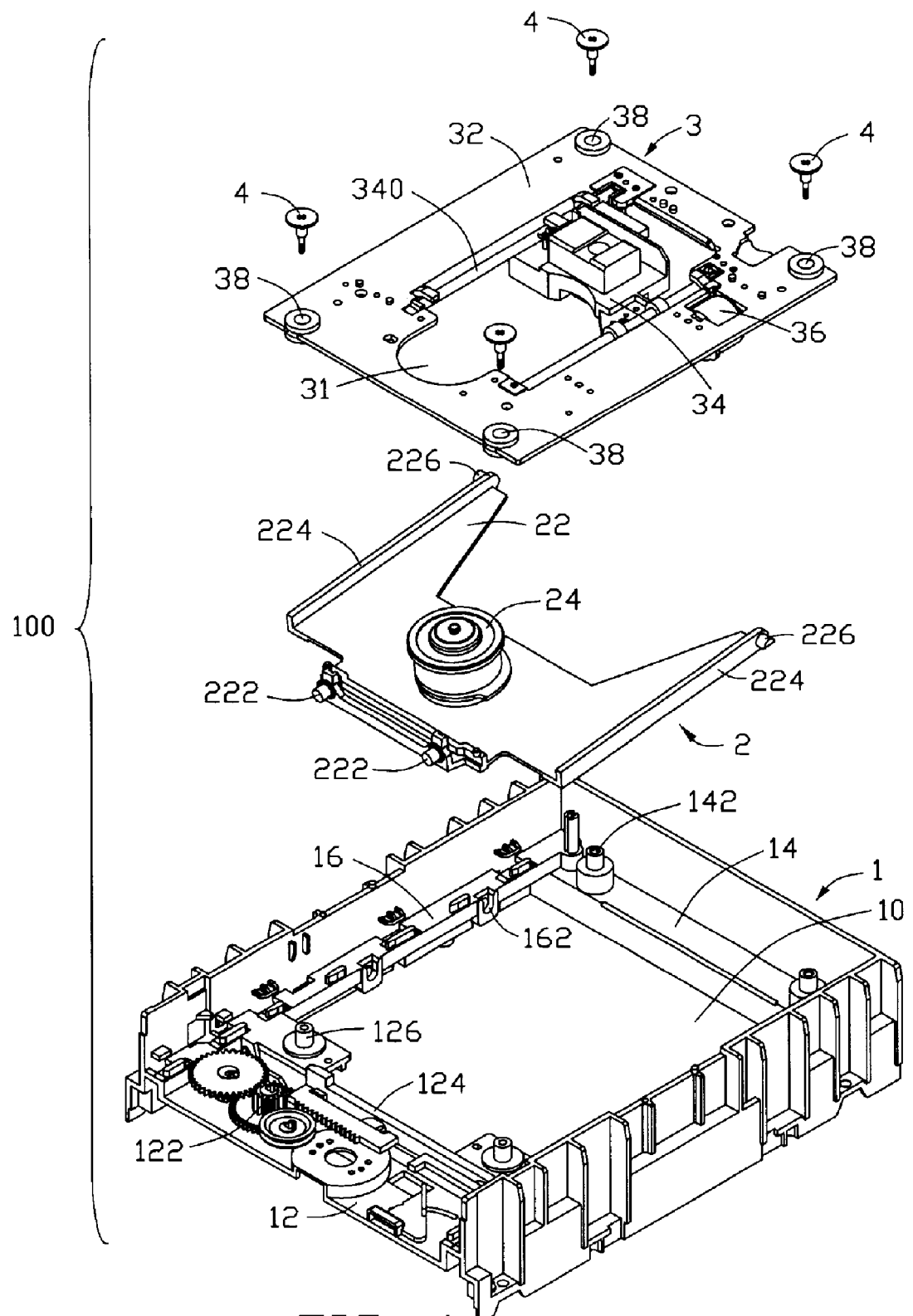
FIG. 4 is an exploded, isometric view of the disc drive of FIG. 2.
Figure 5:
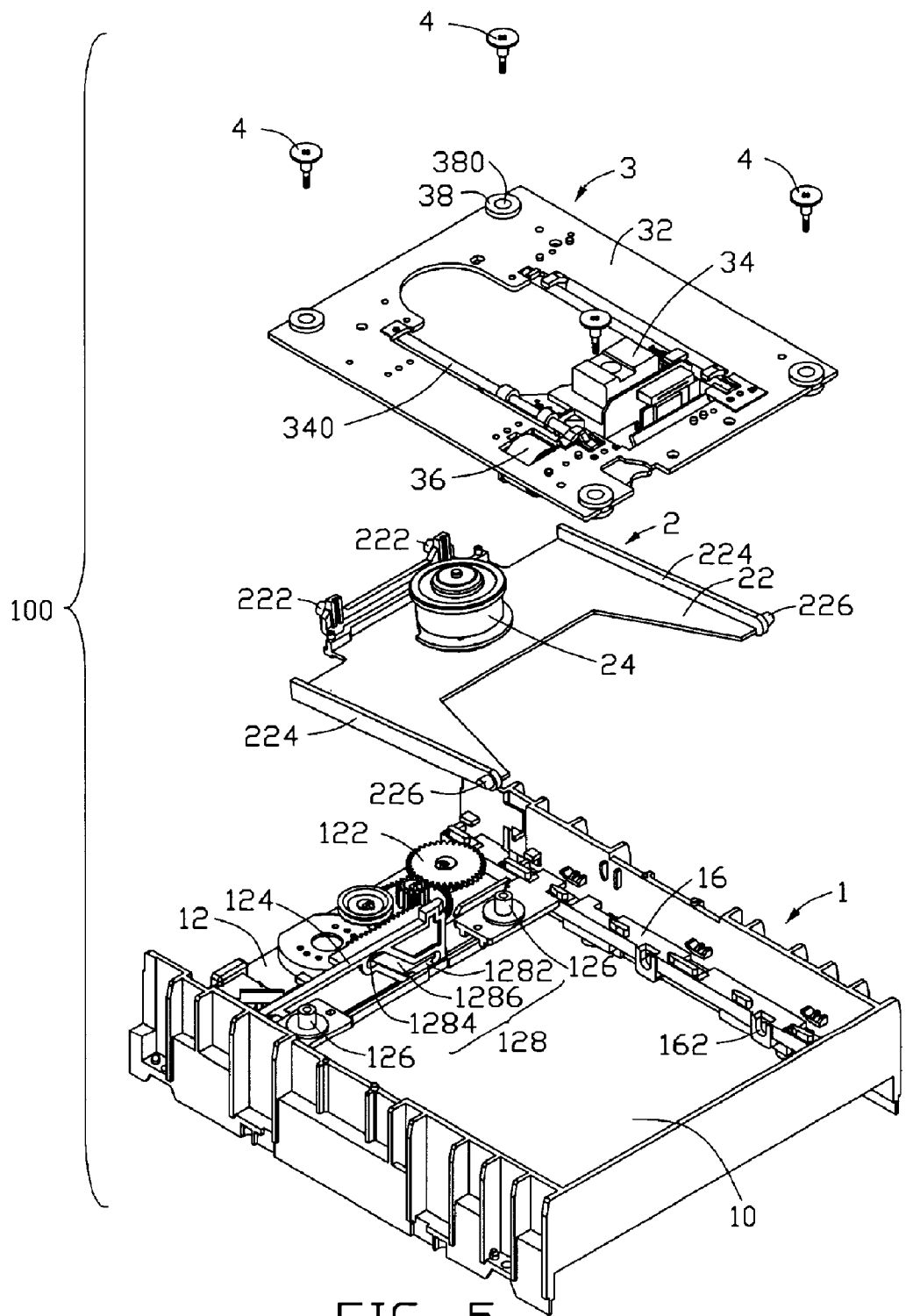
FIG. 5 is similar to FIG. 4, but viewed from another aspect.

Referring to FIG. 4 and FIG. 5, the base 1 includes a front beam 12, a rear beam 14, and two side beams 16. The front beam 12 and the rear beam 14 are connected via the two side beams 16, therefore cooperatively defining a rectangular opening 10 therebetween for receiving the traverse module 3. The front beam 12 supports a gear set 122 thereon. The gear set 122 is geared with a gear rack 124 to transmit power generated by a loading motor (not shown) to the gear rack 124. The gear rack 124 includes a vertical plate (not shown) substantially perpendicular to the front beam 12. The vertical plate defines two parallel zigzag slots 128 therein. Each zigzag slot 128 includes an upper portion 1282 substantially parallel to the front beam 12, a lower portion 1284 also substantially parallel to the front beam 12, and a connecting portion 1286 connecting the upper portion 1282 and the lower portion 1284. Two first posts 126 and two second posts 142 extend respectively from the front beam 12 and the rear beam 14 adjacent to the opening 10. Each side beam 16 defines a pivot hole 162.

Figure 6:
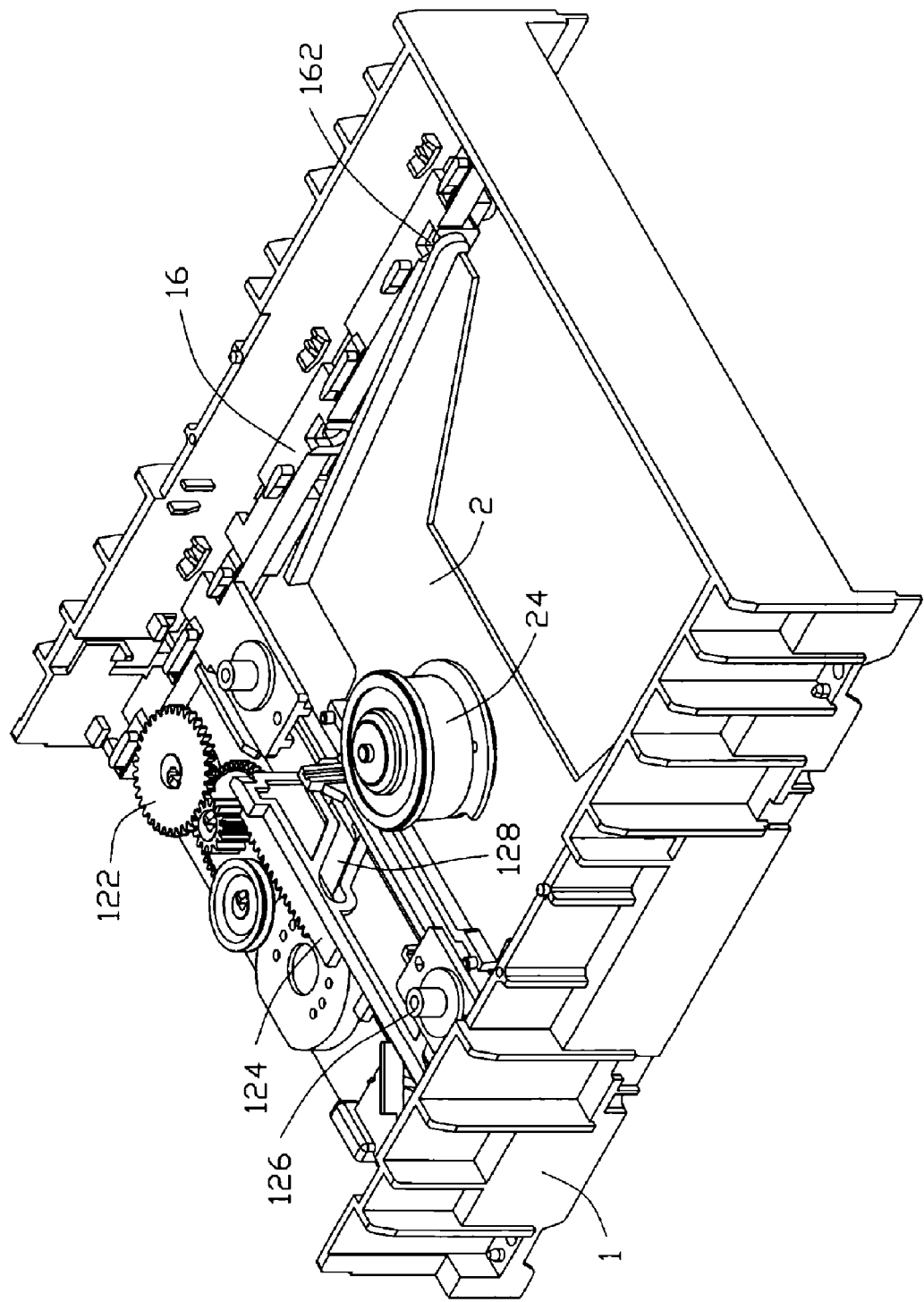
FIG. 6 is and isometric view of the disc drive of FIG. 2, with the traverse module being removed.

The loading frame 2 includes a supporting plate 22 for supporting a spindle motor 24 thereon. The supporting plate 22 includes two pins 222 extending therefrom, two sidewalls 224, and two pivots 226 each extending from one of the two sidewalls 224. A distance between the two pins 222 is equal to a distance between the two zigzag slots 128, so that the two pins 222 can be received in the two zigzag slots 128, respectively. The two pivots 226 whose axes coincide with each other can be received in the two pivot holes 162 in the two side beams 16 (referring to FIG. 6).

The traverse module 3 includes a traverse plate 32 above and having no direct physical connection with the loading frame 2, a pick-up unit 34, a feeding motor 36 connected to the pick-up unit 34 via a feeding screw (not shown), and four dampers 38 located at four corners of the traverse plate 32. The traverse plate 32 defines a cutout 31 allowing the spindle motor 24 to rise up therethrough. The pick-up unit 34 is mounted to the traverse plate 32 via two parallel guiding poles 340 that are fixed on the traverse plate 32, and is moveably relative to the traverse plate 32 along the guiding poles 340. The feeding motor 36 outputs driving energy that is transmitted to the pick-up unit 34 by the feeding screw, thereby driving the pick-up unit 34 to move along the guiding poles 340. Each damper 38 is made of elastic material such as rubber, and defines a through hole 380 allowing a corresponding first post 126 or a corresponding second post 142 inserted therethrough. Each fastening member 4 engages with the corresponding first post 126 or the corresponding second post 142, so as to fix the traverse module 3 onto the base 1. The fastening members 4 may be screws.

In assembly, the gear set 122 and the gear rack 124 are first secured on the front beam 12 of the base 1. Then, the spindle motor 24 is mounted to the loading frame 2, and the loading frame 2 is mounted to the base 1 with the two pins 222 and the two pivots 226 thereof inserted into the zigzag slots 128 and the two pivot holes 162 respectively (referring to FIG. 6). After being assembled onto the base 1, the loading frame 2 is thus rotatable around the two pivot holes 162.

Subsequently, the pick-up unit 34, the feeding motor 36, and the dampers 38 are secured to the traverse plate 32. The traverse plate 32 is placed on the base 1 with the first posts 126 and the second posts 142 inserting through corresponding dampers 38. Finally, the fastening members 4 are inserted into the first posts 126 and the second posts 142 correspondingly. The traverse module 3 is thus mounted to the base 1.

In use, the loading motor is activated to rotate in a first direction, and the gear set 12 is driven to rotate together with the loading motor. The gear rack 124 meshed with the gear set 12 is driven to move vertically towards one of the side beams 16. The two pins 222 positioned in the zigzag slots 128 of the gear rack 124 are brought to move along the zigzag slots 128 toward the upper portions 1282. Thus, the loading frame 2 together with the spindle motor 24 is lifted up, and the spindle motor 24 rises up through the cutout 31 defined in the traverse plate 32 to rotatably support the disc.

The procedure of the loading frame 2 being lowered down is converse to that of the loading frame 2 being lifted up. The loading motor is activated to rotate in a second direction counter to the first direction, and the gear rack 124 that is driven to move towards the a different side beam 16. The two pins 222 are brought to move toward the lower portions 1284 of the zigzag slots 128. Thus, the loading frame 2 together with the spindle motor 24 is lowered down.

The spindle motor 24 is mounted on the loading frame 2 that is separate from the traverse plate 32, while the feeding motor 36 is secured on the traverse plate 32. Therefore, the vibrations caused by the spindle motor 24 may not be transmitted to the pick-up unit 34. Moreover, vibrations generated during the procedure of the loading frame 2 being lifted up or lowered down may not be transmitted to the pick-up unit 34.

Furthermore, because the spindle motor 24 and the feeding motor 36 are mounted on two separate parts, resonance will not occur.

In order to enhance isolation of the vibrations caused by the spindle motor 24 from the pick-up unit 34, elastic sponges may be placed between the loading frame 2 and the base 1.

The embodiments described herein are merely illustrative of the principles of the present invention. Other arrangements and advantages may be devised by those skilled in the art without departing from the spirit and scope of the present invention. Accordingly, the present invention should be deemed not to be limited to the above detailed description, but rather by the spirit and scope of the claims that follow, and their equivalents.

What is claimed is:

1. A disc drive, comprising:
    a base;
    a traverse plate configured for supporting a pick-up unit thereon, the traverse plate being secured to the base;
    a loading frame moveably mounted to the base and separated from the traverse plate, being configured to be moveable relative to the base and the traverse plate; and
    a spindle motor for rotatably supporting a disc thereon, the spindle motor being mounted to the loading frame.

2. The disc drive as claimed in claim 1, further comprising a feeding motor mounted on the traverse plate for driving the pick-up unit to move relative to the traverse plate.

3. The disc drive as claimed in claim 1, wherein the loading frame defines a pair of pivots, the base defines a pair of pivot holes for receiving the pivots, and the loading frame is rotatable around the pivots.

4. The disc drive as claimed in claim 1, wherein the base supports a plate thereon, the plate being moveably relative to the base and defining at least one zigzag slot, the loading frame including at least one pin configured for being movably received in the zigzag slot.

5. The disc drive as claimed in claim 4, further comprising a gear set geared with the plate for transmitting driving energy to the plate to drive the plate to move relative to the base.

6. The disc drive as claimed in claim 1, wherein dampers are disposed between the traverse plate and the base for reducing vibration.

7. The disc drive as claimed in claim 6, wherein the dampers is made of elastic material.

8. The disc drive as claimed in claim 1, wherein the loading frame is located under the traverse plate and is moveable upwards/downwards relative to the traverse plate.

9. A disc drive comprising:
    a feeding motor configured for driving a pick-up unit to reciprocate, the feeding motor being mounted on a first part of the disc drive; and
    a spindle motor configured for rotatably supporting a disc thereon, the spindle motor being mounted on a second part of the disc drive, the second part being separated from the first part and moveably relative to the first part.

10. The disc drive claimed in claim 9, wherein the second part is located under and moveable upwards/downwards relative to the first part.

11. The disc drive as claimed in claim 9, wherein the first part supports the pick-up unit thereon, the pick-up unit being driven by the feeding motor to move relative to the spindle motor.

12. The disc drive as claimed in claim 9, wherein the first part and the second part are mounted on a base of the disc drive.

13. The disc drive as claimed in claim 12, wherein at least one damper is mounted between the second part and the base.

14. The disc drive as claimed in claim 13, wherein said at least one damper is made of elastic material.

15. The disc drive as claimed in claim 12, wherein the first part forms a pair of pivots, and the base defines a pair of pivots holes for rotatably receiving the pair of pivots.

16. The disc drive as claimed in claim 12, wherein the second part forms at least one pin, and the base forms at least one slot for moveably receiving said at least one pin.

17. The disc drive as claimed in claim 16, wherein the pin is moveably along the slot bringing the second part to move upwards/downwards relative to the first part.

18. The disc drive as claimed in claim 16, wherein the slot takes the form of a zigzag.

19. A disc drive comprising:
   a base;
   a traverse plate configured so as to be fixed relative to the base;
   a pick-up unit moveably mounted to the traverse plate;
   a loading frame moveably mounted to the base and having no direct physical connection with the traverse plate so as to isolate vibration therebetween; and
   a spindle motor mounted to the loading frame, the spindle motor being configured for rotating a disc.

20. The disc drive of claim 19, wherein the loading frame is configured so as to be movable toward and away from the traverse plate.

* * * * *